Feb. 18, 1958 V. W. GIDEON 2,823,906
INTERNAL COMBUSTION ENGINE CARBURETOR
Filed July 25, 1955 4 Sheets-Sheet 1

Inventor
Victor W. Gideon
Carlson, Pitzner, Hubbard + Wolfe
Attorneys

Feb. 18, 1958  V. W. GIDEON  2,823,906
INTERNAL COMBUSTION ENGINE CARBURETOR
Filed July 25, 1955  4 Sheets-Sheet 2

Inventor
Victor W. Gideon
Carlson, Pitzner, Hubbard & Wolfe
Attorneys

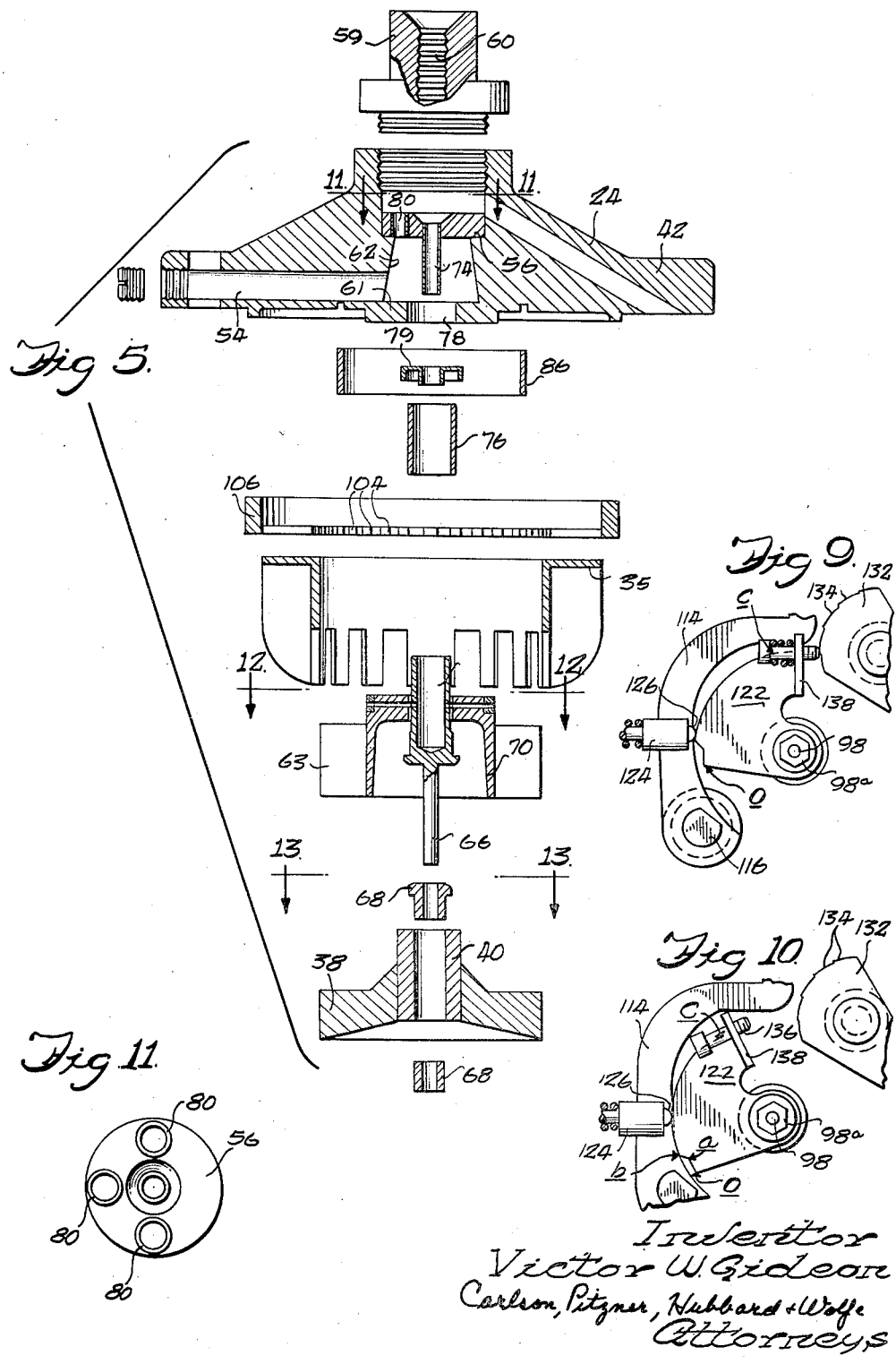

Feb. 18, 1958

V. W. GIDEON 2,823,906

INTERNAL COMBUSTION ENGINE CARBURETOR

Filed July 25, 1955

Inventor
Victor W Gideon
Carlson, Pitzner, Hubbard & Wolfe
Attorneys

United States Patent Office
2,823,906
Patented Feb. 18, 1958

2,823,906

INTERNAL COMBUSTION ENGINE CARBURETOR

Victor W. Gideon, Chicago, Ill., assignor of one-fourth to James G. Culbertson

Application July 25, 1955, Serial No. 524,194

9 Claims. (Cl. 261—56)

The present invention relates to carburetors for internal combustion engines, and more particularly to floatless carburetors having a rotary element for accomplishing both fuel feed and vaporization.

It is a general object of the present invention to provide a novel improved carburetor of the foregoing type which yields smooth variation of air-to-fuel ratio over the entire range of engine speeds so that maximum fuel burning efficiency is obtained at any speed.

It is a more specific object of the invention to provide a carburetor having means automatically responsive to an increase or decrease in engine speed for increasing or decreasing the air-to-fuel ratio. It is a related object to provide a carburetor in which fuel feeding means is actuated by incoming air, together with means for regulating the fuel feed means over the entire range of engine speeds by diverting predetermined amounts of the incoming air around such latter means to thereby vary the air-to-fuel ratio, thus effecting optimum engine efficiency at all times.

It is a further object of the invention to provide such a carburetor wherein the air-to-fuel mixture controlling means is adjusted automatically in response to movement of the main throttle valve. An ancillary object is to provide novel cam means for effecting smooth adjustment of the air-to-fuel ratio to an optimum value in accordance with the degree to which the main throttle valve is opened.

Another object is to provide a carburetor of the above type constructed so that the air-to-fuel ratio which it yields may be adjusted manually from a remote location, as for example from the driver's seat in an automobile, thereby giving optimum performance under varying conditions of traffic or altitudes.

Still another object is to provide such a carburetor which is not choked in the usual sense and yet which may be set for any of a wide range of air-to-fuel ratios.

Finally, it is an object of the present invention to provide a carburetor which is simple to construct, economically manufactured, and requires a minimum of care and maintenance.

Other objects and advantages will become apparent upon reading the attached detailed description, and upon reference to the drawings, in which:

Fig. 5 is an exploded sectional view of the internal parts of the carburetor shown in Fig. 4.

Figs. 9 and 10 are schematic views of the cam mechanism shown in Fig. 1, illustrating the relative position of the elements at various throttle settings.

Figure 13:
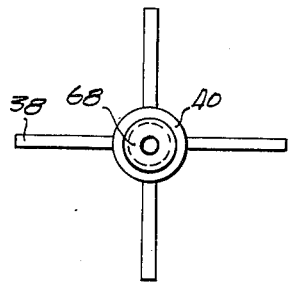
Figure 12:
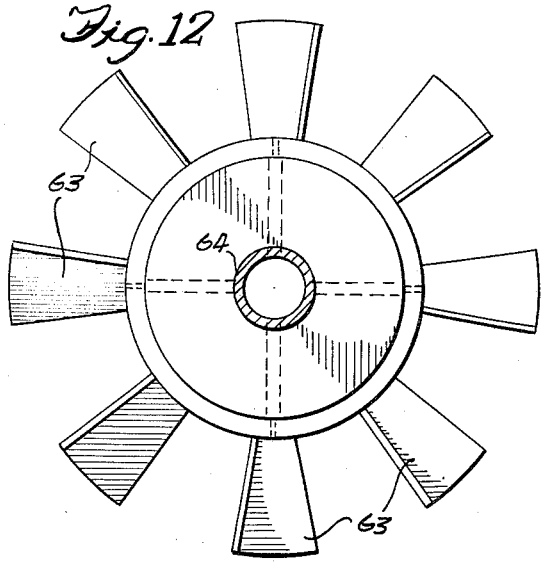

Figs. 11, 12, and 13 are plan views taken along the lines 11—11, 12—12, and 13—13 in Fig. 5.

Figure 14:
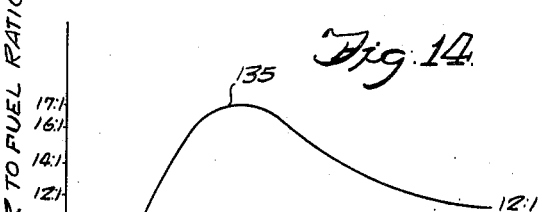

Fig. 14 is a graphical illustration of the relation between the air-to-fuel ratio and the throttle valve setting or position of the cam mechanism.

While the invention has been shown and is described in some detail with reference to a preferred embodiment, it is to be understood that there is no intention thus to limit it to such detail. On the contrary, it is intended here to cover all modifications, alternative constructions and equivalents falling within the spirit and scope of the invention as defined by the appended claims.

Figure 3:
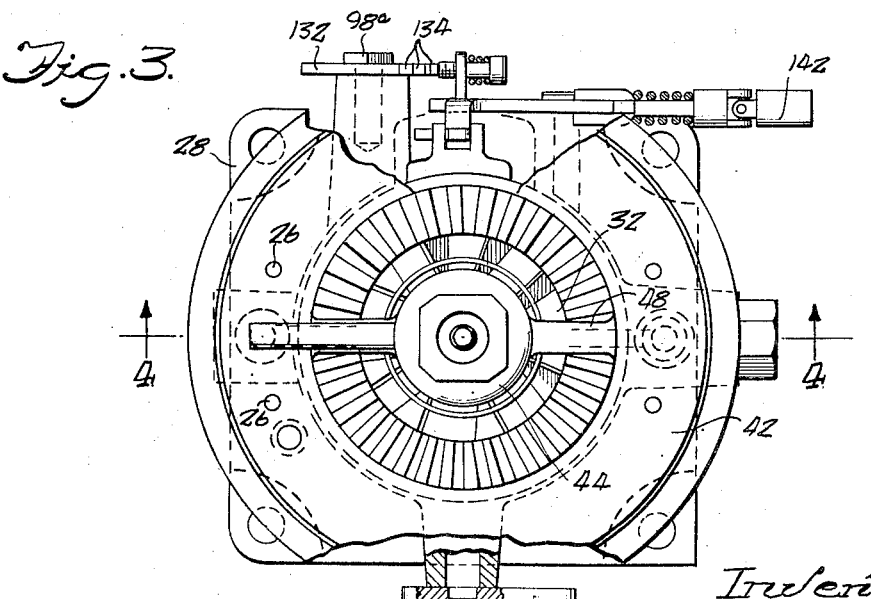
Fig. 3 is a partially cut away plan view of the carburetor shown in Figs. 1 and 2.

Turning now to the drawings, the illustrative carburetor 20 comprises a lower portion or body 22 and a generally ring-shaped top portion 24 held tightly thereon by means of a plurality of vertically disposed machine screws 26 (Fig. 3). The mating portions of the body 22 and top 24 are smoothly machined to effect a liquid tight interface therebetween. The body 22 is hollow and economically formed in one piece, having a flange 28 at its lower end adapted to be fitted to the intake manifold of an internal combustion engine (not shown). A central vertical passage 30 defined by the body 22 is aligned with a central annular opening 32 in the top portion 24 in order that intake air may be drawn through the carburetor as an incident to operation of the engine.

Figure 4:
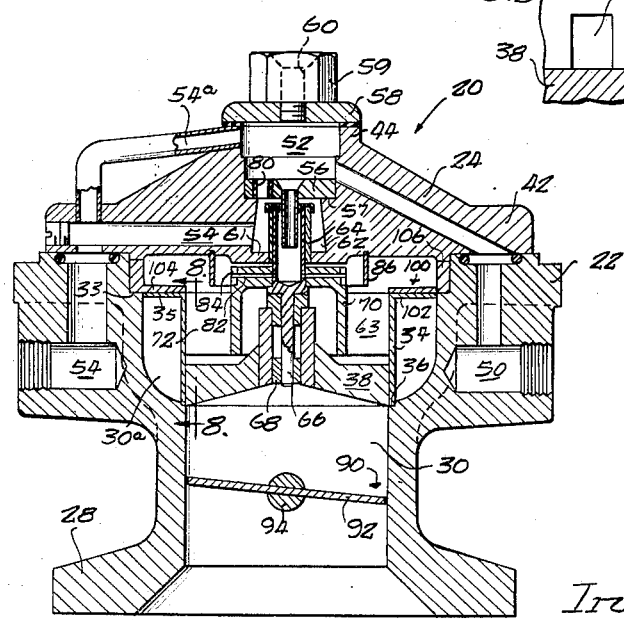
Fig. 4 is a vertical section taken substantially along the line 4—4 in Fig. 3.

Referring particularly to Fig. 4, the central passage 30 is circular in cross-section and includes an enlarged upper portion 30a which terminates in an annular shoulder 33. Vertically disposed within the passage 30a is an annular sleeve 34 having a flange portion 35 extending radially outward from its upper edge. The bottom edge of the sleeve 34 is seated in a suitable annular shoulder 36 formed in the body 22 at the junction of the passages 30 and 30a, the sleeve being positioned so that the upper surface of the flange 35 is in a plane with the body shoulder 33. A spider member 38 having a hollow central hub 40 fits snugly within the lower central portion of the sleeve 34 and is rigidly affixed thereto, as by brazing.

It will be observed that the carburetor top 24 (Figs. 3 and 4) comprises an outer ring portion 42 and a central hollow cylinder 44 supported from the outer ring by means of a pair of oppositely disposed radially extending arms 48 (Fig. 3). Thus the cylinder 44 and ring 42 define the annular opening 32 mentioned above.

In order to supply fuel to the interior of the carburetor 20 the arms 48 are made hollow leading to the interior of the hollow cylinder 44. Thus, a fuel supply passageway 50 (tapped to receive a line fitting) extends from the outer periphery of the body 22 upwardly therethrough and through one of the arms 48, terminating in a fuel reservoir 52 formed within the upper portion of the cylinder 44. A similar passageway 54 extends from the cylinder 44 through the other one of the arms 48 and through the outer periphery of the body 22, permitting excess fuel to return to the storage tank (not shown). Since fuel is supplied to the inlet passage 50 by means of a conventional fuel pump (not shown), a supplemental fuel overflow tube 54a is provided communicating between the upper portion of the reservoir 52 and the passage 54 in order to assure no fuel pressure build up in the reservoir.

The fuel reservoir 52 is cylindrically shaped and defined by a bottom disc 56 seated on a suitable annular shoulder 57 and a cap piece 58 which is in threaded engagement with the upper portion of the cylinder. The cap 58 carries an upwardly extending nutlike portion 59 to facilitate removal thereof and the interior of the nut has a tapped hole 60 therein for supporting a suitable air filter (not shown), if desired. The bottom disc 56 also defines, along with an inner shoulder 61 located in the central lower portion of the cylinder 44, a central fuel overflow chamber 62 beneath the disc, as will be presently described.

An impeller rotor 63 is interposed between the spider 38 and the top portion 24 and adapted to be driven by air drawn through the carburetor. The purpose of the rotor is to eject fuel at high velocity through a plurality of fine jets and into the air passing through the carburetor. In this way the fuel is atomized and vaporized to give a thorough mixing with the air.

For this purpose the rotor 63 is impelled at high speed by the intake air and is adapted to centrifugally eject fuel. As here shown (Figs. 4 and 5), the rotor is positioned within the central passage 30 of the body 22 in such a manner that it extends upwardly into the chamber 62. The rotor includes a shaft having a hollow upper portion 64 and a shouldered lower end 66 journaled and seated by a pair of spaced sleeve bearings 68 fitted into the hollow spider hub 40.

A cup-shaped rotor hub 70 surrounds the shaft and supports a plurality of radially extending impeller blades 72 which extend almost to the inner surface of the annular sleeve 34. The rotor is thus located coaxially within the body 22 and the impeller blades 72 are adapted to spin the rotor through inter-action with inlet air passing downwardly through the opening 32 and thence through the central passage 30.

In order to supply fuel to the hollow interior of the upper shaft portion 64 from the fuel reservoir 52, the disc 56 is provided with a centrally disposed downwardly extending tube 74 which extends about half way into such hollow interior. The shaft portion 64 is journaled within the chamber 62 by means of a sleeve 76 which fits over the shaft with slight clearance and at the same time snugly wedges into a central annular opening 78 provided within the inner shoulder 61. In order to seal the interior of the shaft 64 from fuel passing through the overflow chamber 62, an annular collar 79 having a channel shaped cross section is fitted over the upper end of the shaft 64 and sleeve 76 and is sized to snugly surround the tube 74.

For the purpose of preventing a build up of fuel pressure within the reservoir 52, three ferrules 80 are inserted in the disc 56 (Fig. 11) in off-center relationship to the tube 74 so as to communicate between the reservoir and the annular overflow chamber 62. As will be seen, the chamber 62 empties into the overflow passage 54 so that continually overflowing fuel is carried away to the storage tank.

For the purpose of supplying fuel to the air stream passing through the carburetor, the hub 70 of the rotor 62 is provided with a plurality of hollow fuel supply passageways 82 which extend radially from the hollow interior of the shaft 64 to the outer periphery of the hub. Circularly spaced fuel emission ports or orifices 84 are provided at the outer terminus of each passageway 82 to increase the velocity of the ejected fuel. Such ports are desirably minute in cross-section, in the order of 0.014 inch, with the necessary fuel capacity for different size engines being provided by a greater or lesser number of such ports. Thus it is seen that fuel is ejected radially from the hollow interior of the rotor shaft 64 under the impetus of centrifugal force developed upon rotation of the rotor blades 72 by the flow of air passing through the carburetor and into the engine. A horizontally disposed ring 86, spaced outwardly from the hub 70 and firmly held by the carburetor top 24, forms a skirt surface against which the ejected fuel is directed so that the fuel is atomized by impact and deflected downwardly and into the air stream where it is thoroughly vaporized and mixed with the air.

Figure 2:
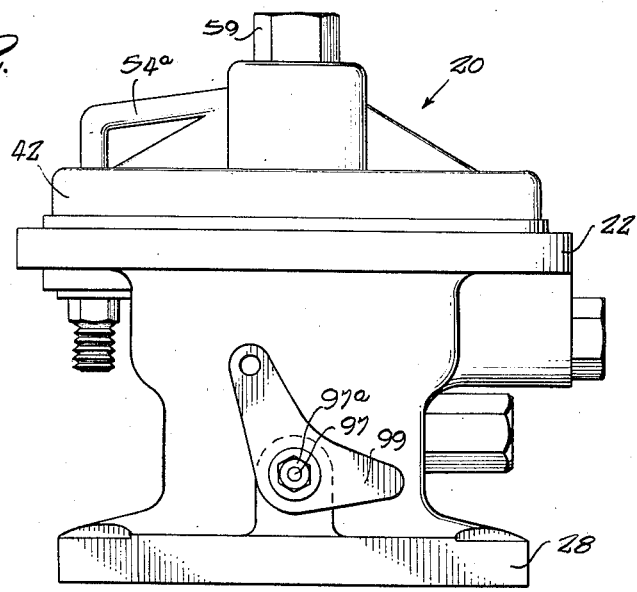
Fig. 2 is a rear elevation of the carburetor shown in Fig. 1.

For the purpose of controlling the rate of air intake, a butterfly throttle valve 90 is arranged within the central passage 30 of the body 22 between the rotor 63 and the flange 28. In this instance, the valve 90 includes a circular plate 92 rigidly mounted on a shaft 94 which extends transversely of the passage 30, the ends of which are suitably journaled in bosses 96 on either side of the body 22. As will be observed, each of the ends 97, 98, of the shaft 94 is screw-threaded and extends slightly beyond its corresponding boss 96. A bell crank 99 (Fig. 2), firmly held to the outer shaft end 97 by a suitable nut 97a, is adapted for connection to an accelerator linkage (not shown) in the conventional manner. Thus, the relative depressed or released position of the accelerator determines the open or closed position of the throttle valve 90 and thereby regulates the quantity of fuel admitted to the engine.

In order to better understand the invention herein set forth, a brief consideration should be given to the fuel burning conditions under which a vehicle engine gives optimum performance. In most internal combustion engines there is an optimum air-to-fuel ratio for each speed of operation. Thus it is desirable to feed to the engine a relatively rich mixture in the order of 10:1 by weight for idling, a leaner mixture up to 17:1 for intermediate speeds above idling, and a richer mixture in the order of 12:1 at relatively high speeds such as are obtained with the throttle valve nearly wide open. Further, it is desirable to progressively vary this ratio at all intermediate engine speeds so that maximum engine efficiency is obtained at every speed.

In accordance with the present invention, the speed of the rotor 63 is varied relative to the rate of air intake, so as to adjust the air-to-fuel mixture, for maximum efficiency, automatically as the throttle 90 is opened from idling to full speed positions. In accomplishing this, adjustable means are provided for by-passing varying proportions of the intake air around the impeller blades 72, together with a linkage between the throttle and such means which sets the latter to give the proper rotor speed, the proper rate of fuel ejection, and thus the proper air-to-fuel ratio for any engine speed. In the present instance, an air-to-fuel mixture adjusting assembly 100 is provided within the carburetor 20, which assembly is regulated by the throttle valve 90 through a novel cam actuated linking mechanism 120 to give optimum air-to-fuel ratios at all engine speeds.

The mixture adjusting assembly 100 comprises an arrangement for by-passing incoming air around the fuel feeding rotor 63 so that the rotor turns more slowly for a given rate of air intake. In this condition the rotor centrifugally ejects fuel at a lower rate, resulting in a higher air-to-fuel ratio.

Figure 6:
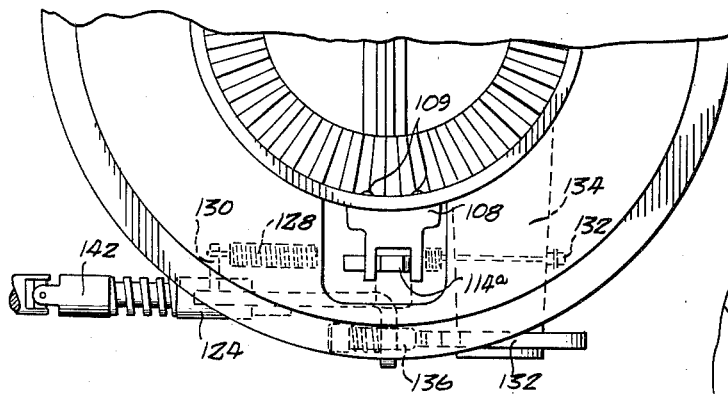
Figs. 6 and 7 are enlarged fragmentary plan views of the carburetor with the top piece removed and showing certain details of the cam means.
Figure 7:
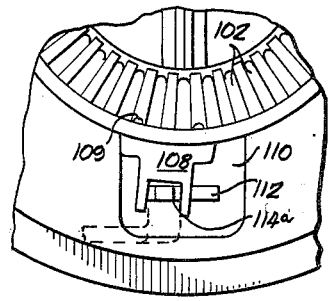

In order to accomplish such by-passing, outwardly extending flange 35 carried by sleeve 34 is provided with a plurality of radially disposed and closely spaced slots (Figs. 6 and 7) 102 which are opened or closed to various degrees by a similarly slotted flange 104 superimposed upon and rotatable relative to the first flange. The rotatable flange 104 extends inwardly from a ring 106 shiftably seated on the annular shoulder 33. The two flanges thus have a shutter-like action.

In order to so shift the ring 106 and thus vary the degree to which the flange 104 uncovers the slots 102, a bifurcated lug 108 (Fig. 7) is secured to the outer periphery of the ring by means of rivets or the like 109 and is adapted to rest horizontally in a recess 110 formed in the body 22 at the junction of the carburetor top 24 therewith. A vertical body slot 112 extending into the recess 110 in tangential relationship to the ring 106 receives the upper end 114a of a curved arm 114 which thus is embraced by the bifurcated lug 108. The arm 114 is pivotably fastened to the flange 28 of the body 22 by means of a suitable machine screw 116. Upon rocking of the arm, the ring 106 and flange 104 are shifted slightly with respect to the flange 35, thereby opening or closing the slots 102.

Figure 8:
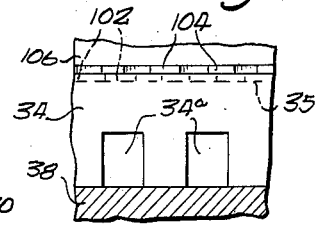
Fig. 8 is a fragmentary vertical section taken substantially along the line 8—8 in Fig. 4.

As shown in Fig. 8, the bottom edge of the sleeve 34 is castellated to form a series of uniformly spaced openings 34a communicating between the passages 30a and 30 so that air passing through the mixture adjusting assembly 100 will be distributed evenly into the fuel mixture moving downwardly from the rotor 63. Thus, as incoming air is by-passed through the mixture adjusting assembly 100 and around the rotor 63, the draft through the rotor is proportionately decreased for the same total air intake rate, with the result that the rotor speed is also decreased and the amount of fuel ejected by the rotor is correspondingly diminished. In this way, the air-to-fuel ratio can be varied as desired.

For properly varying the degree of opening of the by-pass slots 102 according to the position of the throttle valve 90, the linking mechanism 120 includes a sector-like cam 122, having the general shape of a quadrant, one corner of which is secured to the end 98 of the throttle valve shaft 94, as by a suitable nut 98a. Thus it is seen that the cam 122 is rigid with the throttle shaft 94 and moves in an arc in accordance with the motion of the throttle valve.

To transmit the swinging movement of the throttle valve 90 into peripheral shifting movement of the ring 106, the curved arm 114 carries a transverse tapped bushing 124 in which is threaded a snub-nosed cam follower 126, so that circular motion of the cam results in lateral translation of the arm. It will be seen that the arm 114 is shaped to clear the cam 122 so that the follower 126 is biased into engagement with the cam by a helical tension spring 128 (Fig. 6) fastened at one end to a transverse pin 130 carried by the arm and having its other end hooked around a stud 132 carried by a finger 134 extending from the body 22.

Figure 1:
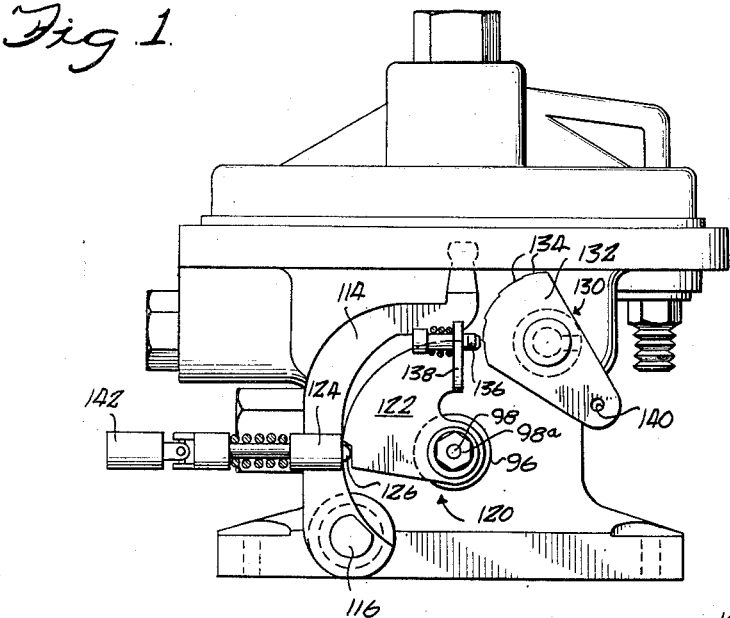
Figure 1 is a front elevation of a carburetor embodying the present invention.

Having observed the general arrangement of the cam 122 in the linking mechanism 120, attention may now be given to the particular configuration of the cam which results in automatic adjustment of the air-to-fuel mixture to optimum value at all ranges of engine speed. With particular reference to Figs. 1, 9 and 10, it is noted that the present invention contemplates the provision of a cam 122 which includes a radially short and relatively flat portion (between the points o and a), a steeply inclined portion increasing in radius (between the points a and b), and a portion (between the points b and c) of gradually decreasing radius over most of the length of the quadrant to terminate in a cam radius only slightly greater than at the point o. As will be described presently, the flat cam portion between the points o and a in acting on the follower 126 produces an idling fuel ratio of approximately 10:1, the point b produces a lean fuel ratio of about 17:1, and the point c fixes the ratio at approximately 12:1. Thus it is seen that the follower 126 bears against the cam 122 between the points o and a when the throttle valve 90 is closed, and the cam rotates counter-clockwise (as viewed in Figs. 1, 9 and 10) as the throttle is opened. One of the advantageous features of the cam 122 is that intermediate fuel ratios are realized at corresponding intermediate points along the cam surface.

Plotted on the graph shown in Fig. 14 is a curve 135 which correlates the throttle valve opening, or alternatively the movement of the cam with specific air-to-fuel ratios attained. Thus it is observed that the portion of the curve 135 corresponding to the cam surface between o and a is flat at an air-to-fuel ratio of about 10:1. In order to turn the cam through the portion o to a with respect to the follower 126, the throttle valve 90 opens from a substantially shut portion to about 7° open, this being the engine idling speed range. Then as the throttle valve opens to about 10°, the cam follower rides up the sharply inclined cam surface a to b until an optimum relatively lean fuel-to-air ratio of about 17:1 is reached. Further opening of the throttle valve to a wide open position (90° open) turns the cam so that the follower rides over the radially decreasing portion b to c, and as will be observed, the air-to-fuel ratio gradually decreases so that a relatively rich fuel mixture is fed to the engine at high engine speeds. When the throttle valve 90 is wide open, the curve 135 levels off to indicate an optimum high speed fuel ratio of about 12:1.

*Operation*

Prior to starting the vehicle engine, i. e., when the throttle valve 90 is closed, the arm 114 is biased by the spring 128 to bring the cam follower 126 against the cam surface at about the point o. The flange 104 thus substantially closes the slots 102 in the mixture adjusting assembly 100. When the engine is started and the throttle valve is opened slightly, the cam 122 turns a few degrees (counter-clockwise as viewed in Fig. 1) and the follower 126 rides on the uniform radius portion of the cam between the points o and a. The arm 114 is not moved as yet so that the shutter assembly 100 remains closed. Under these conditions all of the air passing into the engine is drawn down past the rotor 63 thereby giving the rotor maximum speed for the rate of air intake and causing it to centrifugally eject fuel at a relatively high rate into the air stream. The fuel emission orifices 84 are so sized with respect to the operating draft that an air-to-fuel ratio in the order of 10:1 is attained at this time. Again, such a relatively rich mixture is required in order to start up the engine and maintain an idling condition.

As the throttle valve 90 is opened to increase the engine speed, the stationary cam follower 126 rides up the steeply inclined portion on the cam 122 and thereby moves the curved arm 114 so that the ring 106 is angularly shifted to open the slots 102 in the sleeve 34. Thus, a portion of the incoming air is by-passed around the rotor 63, passing through the slots 102 and the sleeve openings 34a, and then passing into and diluting the fuel and air stream emerging from the rotor. Thus, as the air intake rate increases with engine speed, the velocity of the rotor 63 is decreased in proportion to the rate of air intake, so that relatively less fuel is ejected from the ports 84. When the cam follower 126 reaches the cam point b, the air-to-fuel ratio has been increased from 10:1 to a considerably leaner mixture on the order of 17:1, which gives optimum fuel economy at the corresponding engine speed.

Upon further increasing the engine speed by opening the throttle valve 90 wider, the cam follower 126 begins to ride down the radially decreasing portion of the cam between b and c, so that the arm 114 moves in a direction to gradually reclose the shutter assembly 100. With a smaller portion of the air stream by-passed, the rotor 63 thus has a greater speed, in relation to the total air intake rate, and therefore ejects fuel at a proportionally greater rate. This progressively increases the air-to-fuel ratio to provide a richer mixture, as required at high engine speeds. When the follower 126 rides on the cam point c, corresponding to a substantially wide open position of the throttle valve 90, the air by-passing arrangement is so adjusted that the optimum air-to-fuel ratio is about 12:1. The optimum adjustment of fuel mixtures for each setting of the throttle obtained in practicing the present invention are illustrated by the graph shown in Fig. 14 which is a plot of experimental results achieved.

The cam 122 may be automatically adjusted with respect to the follower 126 and arm 114 to give richer mixtures at low engine temperatures by means of a thermostatic control arrangement 130. Such arrangement includes a temperature control cam 132 which is mounted on the end of the finger member 134 and rotates clockwise as viewed in Fig. 1. One edge of the cam 132 is interrupted to form a series of radially spaced lands 134 against which rests an adjusting screw 136 carried by an arm 138 transversely affixed to the throttle cam 122. A hole 140 is provided on the cam 132 for connecting the cam with suitable linkage from a conventional engine thermostat (not shown). Thus, when the engine temperature is relatively low, as when just being started, the temperature control cam 132 rotates clockwise to present to the screw 136 a land 134 having a relatively short radius so that the shutter assembly 100 remains closed and a rich fuel mixture, for example 10:1, is admitted to the engine. As the engine becomes warmed up, the cam 132 returns (counter-clockwise) to its original position, forcing the throttle cam 122 slightly counter-clockwise and thereby opening the mixture adjusting assembly 100 enough to reduce the amount of fuel centrifugally ejected through the rotor orifices, and thus decreasing the air-to-fuel ratio.

The operation of an internal combustion engine may be effected by changes in the altitude of its operation as a result of differences in density of the atmosphere. Such changes are noticeable particularly, for example, when automobile carburetors have been set for proper operation at sea level and the automobiles are then operated in mountainous country. The present carburetor lends itself admirably to corrective adjustments for such changing conditions by manually controlled means. As shown in Fig. 1, a link 142 is connected to the end of the cam follower 126 which, as explained above, is threaded in the boss 124 on the arm 114. The link is adapted to receive a suitable control cable or the like (not shown) for rotating the follower 126 and thus adjusting its axial position in the boss 124. For example, a control knob may be located on an automobile dashboard and mechanically connected for controllably positioning the follower 126. This, in turn, adjusts the initial position of the arm 114 and the initial degree of opening for the by-pass slots 102. As the throttle is opened, the cam 122 shifts the arm 114, as before, to vary the air and fuel mixture. The variation shown by Fig. 14 will be obtained, except that the whole curve 135 is shifted up or down by adjusting the axial position of the follower 126 relative to the arm 114. Thus, instead of maintaining an idling air-to-fuel ratio of the order of 10:1, this ratio may be fixed at 7:1 or 8:1, or the ratio may be made leaner in fuel, as for example 11:1 or 12:1.

I claim:

1. In a carburetor, the combination of a housing having a generally annular passageway for axial flow of intake air from end to end thereof, throttle means at one end of said passageway for regulating the rate of air flow, a rotor journaled in said housing and having blades thereon disposed in said passageway to effect rotation of the rotor, said rotor having a plurality of minute fuel ejection ports therein opening outward for the emission of fuel under the impetus of centrifugal force imparted by rotation of said rotor and into air passing over said blades, means for supplying fuel through the interior of said rotor to said ports, means including a shutter assembly surrounding said rotor for by-passing variable proportions of the air flowing through said passageway around said rotor blades, and means including a cam and follower responsive to the position of said throttle means for smoothly adjusting said shutter assembly to thereby vary the rotational speed of said rotor relative to the rate of air intake to correctively adjust the ratio of air and fuel supplied by the carburetor.

2. In a carburetor, the combination of a housing having a generally annular passageway for axial flow of intake air from end to end thereof, throttle means at one end of said passageway for regulating the rate of air flow, a rotor journaled in said housing and having blades thereon disposed in said passageway to effect rotation of the rotor, said rotor having a plurality of minute fuel ejection ports therein opening outward for the emission of fuel under the impetus of centrifugal force imparted by rotation of said rotor and into air passing over said blades, means for supplying fuel through the interior of said rotor to said ports, means for by-passing variable proportions of the air flowing through said passageway around said rotor blades, and means responsive to the position of said throttle means for smoothly adjusting said last-named means to thereby vary the ratio of air and fuel supplied by the carburetor.

3. In a carburetor, the combination of a housing having a generally annular passageway for axial flow of intake air from end to end thereof, throttle means at one end of said passageway for regulating the rate of air flow, a rotor journaled in said housing and having blades thereon disposed in said passageway to effect rotation of the rotor, said rotor having a plurality of minute fuel ejection ports therein opening outward for the emission of fuel under the impetus of centrifugal force imparted by rotation of said rotor and into air passing over said blades, means for supplying fuel through the interior of said rotor to said ports, means for by-passing variable proportions of the air flowing through said passageway around the rotor blades, and means including a cam and cam follower responsive to the position of said throttle means for smoothly adjusting said last-named means to thereby vary the ratio of air and fuel supplied by the carburetor.

4. In a carburetor, the combination of a housing having a generally annular pasageway for axial flow of intake air from end to end thereof, butterfly throttle means mounted on a shaft at one end of said passageway for regulating the rate of air flow, a rotor journaled in said housing and having blades thereon disposed in said passageway to effect rotation of the rotor, said rotor having a plurality of minute fuel ejection ports therein opening radially outward for the emission of fuel under the impetus of centrifugal force imparted by rotation of said rotor and into air passing over said blades, means for supplying fuel through the interior of said rotor to said ports, means for by-passing variable proportions of the air flowing through said passageway around said rotor blades, said by-passing means including a shutter assembly having movable and stationary elements surrounding said rotor, and cam means responsive to the position of said throttle means for smoothly adjusting said by-passing means to thereby vary the ratio of air and fuel supplied by the carburetor, said cam means comprising a cam rigid with said throttle shaft and a cam follower arm connected with said movable shutter element.

5. In a carburetor, the combination of a housing having a generally annular passageway for axial flow of intake air from end to end thereof, throttle means at one end of said passageway for regulating the rate of air flow, a rotor journaled in said housing and having blades thereon disposed in said passageway to effect rotation of the rotor, said rotor having a plurality of minute fuel ejection ports therein opening outward for the emission of fuel under the impetus of centrifugal force imparted by rotation of said rotor and into air passing over said blades, means for supplying fuel through the interior of said rotor to said ports, means for by-passing variable proportions of the air flowing through said passageway around the rotor blades, means responsive to substantial closure of said throttle means for substantially closing said by-pass means, means responsive to progressive opening of said throttle means up to a predetermined point for progressively opening said by-pass means, and means responsive to opening of said throttle means beyond said predetermined point for progressively closing said by-pass means.

6. In a carburetor, the combination of a housing having a generally annular passageway for axial flow of intake air from end to end thereof, throttle means at one end of said passageway for regulating the rate of air flow, a rotor journaled in said housing and having blades thereon disposed in said passageway to effect rotation of the rotor, said rotor having a plurality of minute fuel ejection ports therein opening outward for the emission of fuel under the impetus of centrifugal force imparted by rotation of said rotor and into air passing over said blades, means for supplying fuel through the interior of said rotor to said ports, means for by-passing variable proportions of the air flowing through said passageway around said rotor blades, and means responsive to the position of said throttle means for smoothly adjusting said last-named means to thereby vary the ratio of air and fuel supplied by the carburetor, said adjusting means including a cam being of generally quadrant shape and having a contour including in continuous relationship a relatively short portion of uniform radius and a short portion of steeply increasing radius followed by a relatively long portion of gradually decreasing radius.

7. In a carburetor including a housing having a generally annular passageway for axial flow of intake air from end to end thereof, throttle means at one end of said passageway for regulating the rate of air flow, a rotor journaled in said housing and having blades thereon disposed in said passageway to effect rotation of the rotor, the rotor having a plurality of minute fuel ejection ports therein opening outward for the emission of fuel under the impetus of centrifugal force imparted by rotation of said rotor and into air passing over said blades, and means for supplying fuel through the interior of said rotor to said ports, the combination comprising means for by-passing variable proportions of the air flowing through said passageway around the rotor blades, and means responsive to the position of said throttle means for smoothly adjusting said last-named means to thereby vary the ratio of air and fuel supplied by the carburetor, said adjusting means being interposed between and operatively connected with each of said by-passing and throttle means, and said adjusting means including a cam being of generally quadrant shape and having a contour including in continuous relationship a relatively short portion of uniform radius and a short portion of steeply increasing radius followed by a relatively long portion of gradually decreasing radius.

8. In a carburetor, the combination of a housing having a generally annular passageway for axial flow of intake air from end to end thereof, throttle means at one end of said passageway for regulating the rate of air flow, a rotor journaled in said housing and having blades thereon disposed in said passageway to effect rotation of the rotor, said rotor having a plurality of minute fuel ejection ports therein opening outward for the emission of fuel under the impetus of centrifugal force imparted by rotation of said rotor and into air passing over said blades, means for supplying fuel through the interior of said rotor to said ports, means including a shutter assembly surrounding said rotor for by-passing variable proportions of the air flowing through said passageway around said rotor blades, and means including a cam and follower responsive to the position of said throttle means for smoothly adjusting said shutter assembly to thereby vary the ratio of air and fuel supplied by the carburetor, said shutter assembly comprising a pair of opposed slotted flanges disposed in said housing about the rotor, one of said flanges being shiftable with respect to the other through said cam and follower to align the slotted portions of the flanges and thereby by-pass air around said rotor blades.

9. In a carburetor, the combination of a housing having a generally annular passageway for axial flow of intake air from end to end thereof, throttle means at one end of said passageway for regulating the rate of air flow, a rotor journaled in said housing and having blades thereon disposed in said passageway to effect rotation of the rotor, said rotor having a plurality of minute fuel ejection ports therein opening outward for the emission of fuel under the impetus of centrifugal force imparted by rotation of said rotor and into air passing over said blades, means for supplying fuel through the interior of said rotor to said ports, means for by-passing variable proportions of the air flowing through said passageway around the rotor blades, means including a cam and cam follower responsive to the position of said throttle means for smoothly adjusting said last-named means to thereby vary the ratio of air and fuel supplied by the carburetor, and means for remotely adjusting said cam follower to thereby calibrate said by-passing means to offset atmospheric changes in intake air.

References Cited in the file of this patent

UNITED STATES PATENTS

| | | |
|---|---|---|
| 1,207,224 | Schlayer | Dec. 5, 1916 |
| 1,482,175 | Wilson | Jan. 29, 1924 |
| 1,744,865 | Buckley | Jan. 28, 1930 |
| 2,223,836 | Snyder | Dec. 3, 1940 |
| 2,314,170 | Snyder | Mar. 16, 1943 |
| 2,365,968 | Mason | Dec. 26, 1944 |
| 2,668,698 | Rollins | Feb. 9, 1954 |

FOREIGN PATENTS

| | | |
|---|---|---|
| 161,070 | Great Britain | Apr. 7, 1921 |